United States Patent
An et al.

(10) Patent No.: US 7,349,373 B2
(45) Date of Patent: Mar. 25, 2008

(54) APPARATUS AND METHOD FOR DETERMINING SOFT OR SOFTER HANDOFF IN MOBILE COMMUNICATION SYSTEM

(75) Inventors: Jong Hoe An, Kyonggi-do (KR); Chan Ho Kyung, Incheon (KR)

(73) Assignee: LG Electronics Inc., Seoul (KR)

( * ) Notice: Subject to any disclaimer, the term of this patent is extended or adjusted under 35 U.S.C. 154(b) by 586 days.

(21) Appl. No.: 10/793,158

(22) Filed: Mar. 3, 2004

(65) Prior Publication Data
US 2004/0202131 A1    Oct. 14, 2004

(30) Foreign Application Priority Data
Apr. 11, 2003    (KR) ............... 10-2003-0023029

(51) Int. Cl.
*H04Q 7/00* (2006.01)

(52) U.S. Cl. ............ 370/331; 370/332; 370/333; 370/334; 455/436; 455/437; 455/438; 455/442; 455/443; 455/444

(58) Field of Classification Search ........ 370/331, 370/332, 333, 334; 455/436, 437, 438, 439, 455/440, 441, 442, 443, 444
See application file for complete search history.

(56) References Cited

U.S. PATENT DOCUMENTS

| | | | | |
|---|---|---|---|---|
| 5,999,522 A | * | 12/1999 | Rohani | 370/331 |
| 6,085,335 A | * | 7/2000 | Djoko et al. | 714/26 |
| 6,438,376 B1 | * | 8/2002 | Elliott et al. | 455/437 |
| 6,545,984 B1 | * | 4/2003 | Simmons | 370/254 |
| 7,155,223 B2 | * | 12/2006 | O'Brien | 455/436 |
| 2003/0119511 A1 | * | 6/2003 | Shin | 455/439 |

* cited by examiner

*Primary Examiner*—Steve M. D'Agosta
(74) *Attorney, Agent, or Firm*—Lee, Hong, Degerman, Kang & Schmadeka

(57) ABSTRACT

Apparatus and method for determining soft or softer handoff are described. The present invention includes the steps of comparing sectors in an active set to set values corresponding to the soft or softer handoff for the sectors, respectively in a base station, transmitting a first parameter for selecting cell switching parameters between the sectors neighboring each other in the active set to a mobile station wherein the set values for the respective sectors are included in the first parameter, generating values of a parameter PDCH_GROUP_IDENTIFIER corresponding to a packet data channel group identifier using the set values included in the first parameter, determining whether a serving sector and a target sector among the sectors are in the soft or softer handoff using the generated values of the parameter PDCH_GROUP_IDENTIFIER, and selecting the cell switching parameters accordingly.

22 Claims, 10 Drawing Sheets

APPARATUS AND METHOD FOR DETERMINING SOFT OR SOFTER HANDOFF IN MOBILE COMMUNICATION SYSTEM

CROSS REFERENCE TO RELATED APPLICATIONS

Pursuant to 35 U.S.C. § 119(a), this application claims the benefit of the Korean Application No. P2003-23029 filed on Apr. 11, 2003, the content of which is hereby incorporated by reference herein in its entirety.

BACKGROUND OF THE INVENTION

1. Field of the Invention

The present invention relates to a mobile communication system, and more particularly, to an apparatus and method for determining soft or softer handoff on cell switching in a mobile communication system.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G is used to refer to the analog phone system, known as an AMPS (Advanced Mobile Phone Service) phone systems. 2G is commonly used to refer to the digital cellular systems that are prevalent throughout the world, and include CDMA-One, Global System for Mobile communications (GSM), and Time Division Multiple Access (TDMA). 2G systems can support a greater number of users in a dense area than can 1G systems.

3G is commonly used to refer to the digital cellular systems currently being developed. Recently, third-generation (3G) CDMA communication systems have been proposed including proposals, such as cdma2000 and W-CDMA. These 3G communication systems are conceptually similar to each other with some significant differences.

A cdma2000 system is a third-generation (3G) wideband, spread spectrum radio interface system which uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

FIG. 1 illustrates a wireless communication network architecture.

Referring to FIG. 1, a subscriber uses a Mobile Station to access network services. The Mobile Station may be a portable communications unit, such as a hand-held cellular phone, a communication unit installed in a vehicle, or even a fixed-location communications unit.

The electromagnetic waves from the Mobile Station are transmitted by the Base Transceiver System (BTS) also known as node B. The BTS consists of radio devices such as antennas and equipment for transmitting radio waves. The Base Station Controller (BSC) receives the transmissions from one or more BTS's. The BSC provides control and management of the radio transmissions from each BTS by exchanging messages with the BTS and the Mobile Switching Center (MSC) or Internal IP Network. The BTS's and BSC are part of the Base Station (BS).

The BS exchanges messages with and transmits data to a Circuit Switched Core Network (CSCN) and Packet Switched Core Network (PSCN). The CSCN Provides traditional voice communications and the PSCN provides Internet applications and multimedia services.

The Mobile Switching Center (MSC) portion of the CSCN provides switching for traditional voice communications to and from an Mobile Station and may store information to support these capabilities. The MSC may be connected to one of more BS's as well as other public networks, for example a Public Switched Telephone Network (PSTN) or Integrated Services Digital Network (ISDN). A Visitor Location Register (VLR) is used to retrieve information for handling voice communications to or from a visiting subscriber. The VLR may be within the MSC and may serve more than one MSC.

A user identity is assigned to the Home Location Register (HLR) of the CSCN for record purposes such as subscriber information, for example Electronic Serial Number (ESN), Mobile Directory Number (MDR), Profile Information, Current Location, and Authentication Period. The Authentication Center (AC) manages authentication information related to the Mobile Station. The AC may be within the HLR and may serve more than one HLR. The interface between the SC and the HLR/AC is an IS-41 standard interface.

The Packet Data Serving Node (PDSN) portion of the PSCN provides routing for packet data traffic to an from Mobile Station. The PDSN establishes, maintains, and terminates link layer sessions to the Mobile Station's and may interface with one of more BS and one of more PSCN.

The Authentication, Authorization and Accounting (AAA) Server provides Internet Protocol authentication, authorization and accounting functions related to packet data traffic. The Home Agent (HA) provides authentication of MS IP registrations, redirects packet data to an from the Foreign Agent (FA) component of the PDSN, and receives provisioning information for users from the AAA. The HA may also establish, maintain, and terminate secure communications to the PDSN and assign a dynamic IP address. The PDSN communicates with the AAA, HA and the Internet via an Internal IP Network.

FIG. 2 illustrates a data link protocol architecture layer for a wireless network.

Referring to FIG. 2, the upper layer contains three basis services; voice services 62, data services 61 and signaling 70. Voice services 62 include PSTN access, mobile-to-mobile voice services, and Internet telephony. Data services 61 are services that deliver any form of data on behalf of a mobile end user and include packet data applications (e.g., IP service), circuit data applications (e.g., asynchronous fax and B-ISDN emulation services), and SMS. Signaling 70 controls all aspects of mobile operation.

The Link Layer 30, is subdivided into the Link Access Control (LAC) sublayer 32 and the Medium Access Control (MAC) sublayer 31. The link layer provides protocol support and control mechanisms for data transport services and performs the functions necessary to map the data transport needs of the upper levels 60 into specific capabilities and characteristics of the physical layer 20. The Link Layer 30 may be viewed as an interface between the upper layers and the Physical Layer 20.

The separation of MAC 31 and LAC 32 sublayers is motivated by the need to support a wide range of upper layer services, and the requirement to provide for high efficiency and low latency data services over a wide performance range (from 1.2 Kbps to greater than 2 Mbps). Other motivators are the need for supporting high QoS delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer manages point-to point communication channels between upper layer entities and provides framework to support a wide range of different end-to-end reliable link layer protocols.

The MAC sublayer 31 facilitates complex multimedia, multi-services capabilities of 3G wireless systems with Quality of Service (QoS) management capabilities for each active service. The MAC sublayer 31 provides procedures for controlling the access of data services (packet and circuit) to the physical layer 20, including the contention control between multiple services from a single user, as well as between competing users in the wireless system. The MAC sublayer 31 also provides for reasonably reliable transmission over the radio link layer using a Radio Link Protocol (RLP) 33 for a best-effort level of reliability. Signaling Radio Burst Protocol (SRBP) 35 is an entity that provides connectionless protocol for signaling messages. Multiplexing and Quality of Service (QoS) Control 34 is responsible for enforcement of negotiated QoS levels by mediating conflicting requests from competing services and the appropriate prioritization of access requests.

The Physical Layer 20, is responsible for coding and modulation of data transmitted over the air. The Physical Layer 20 conditions digital data from the higher layers so that the data may be transmitted over a mobile radio channel reliably.

The Physical Layer 20 maps user data and signaling, which are delivered by the MAC sublayer 31 over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

Generally, in the 1xEV-DV (1xEvolution-Data and Voice) system, when a mobile station is in a soft or softer handoff area, a base station transmits packet data on forward-packet data channel (hereinafter abbreviated F-PDCH) in forward link from (or through) a serving sector only among various sectors in an active set. The active set is the list of pilots that are being used for the current communication. In other words, the active set is the list of sectors that are in communication with the mobile station.

If it is requested to switch the serving sector as the channel status or signal power is changed, the serving sector is replaced by a sector having the best status (or target sector), for example the strongest signal power level. The data is then communicated between the mobile station and the base station of the replaced target sector as a new serving sector. Such a procedure is called 'cell switching'.

FIG. 3 is a diagram of determining and managing one serving sector in an active set. Referring to FIG. 3, a mobile station measures strength of a pilot signal from each sector in a neighbor set and tests whether the measured signal meets certain requirements, such as the signal being greater than a certain threshold value (for example, T_ADD). If a result of the test is acceptable, the terminal informs a base station of information about the strength of the pilot signal of each of the corresponding sectors through an extended pilot strength measurement message (EPSMM). The neighbor set is a set of sectors or pilots in the vicinity of the sectors currently transmitting to the mobile station. The contents of the neighbor set are normally configured by the base station.

The base station uses the strength information of the received pilot signal to determine the active set and then informs the mobile station of the determined active set through, for example, a universal handoff direction message. Conversely, the mobile station measures strength of a pilot signal from each sector in the active set and tests whether the measured strength is smaller than a predetermined threshold value (for example, T_DROP). If the measured strength is smaller than the predetermined threshold value T_DROP, the mobile station informs the base station of information concerning the strength of the pilot signal of each corresponding sector in the active set through an extended pilot strength measurement message (EPSMM). The base station uses the strength information of the received signal to determine the corresponding sectors as an active set and then sends the active set through, for example, the universal handoff direction message (UHDM). Generally, the sectors that are not included in the UHDM as the active set will be included in the neighbor set.

Moreover, the mobile station measures strength of the pilot signal of each sector in the active set for cell switching to select an optimal sector as a serving sector and then informs the base station of the determined serving sector through a channel quality indicator (CQI) cover of a reverse channel quality indicator channel (R-CQICH).

If the CQI cover received through the R-CQICH indicates a sector of its own, the corresponding sector recognizes to be selected as the serving sector and starts transmission of the packet data accordingly.

FIG. 3 illustrates an example of sector 1 being selected as a serving sector. FIG. 4 illustrates an example of cell switching.

Referring to FIG. 4, a mobile station is receiving packet data 1, packet data 2, and packet data 3 through sector 2, which is a current serving sector. If sector 3 is designated as a new serving sector since status of channel R-CQICH is changed, the mobile station should direct the sector 3 with the CQI cover. The sector 3 used as the serving sector then receives packet data 4 from a base station controller (BSC) and transmits the received packet data to the mobile station.

As mentioned in the foregoing explanation, in order to perform the cell switching correctly in the mobile communication network, an efficient method is needed to judge that the corresponding cells/sectors for the cell switching lie in what kind of handoff areas, respectively. However, the related art fails to propose any method of having the base station or mobile station judge the areas efficiently.

SUMMARY OF THE INVENTION

Accordingly, the present invention is directed to a method of determining soft or softer handoff on cell switching in a mobile communication system that substantially obviates one or more problems due to limitations and disadvantages of the related art.

An object of the present invention is to provide a method of determining soft or softer handoff on cell switching in a mobile communication system having a base station and a terminal, by which it is able to efficiently determine cell-switching-related sectors lie in what kind of handoff areas, respectively on cell switching.

Another object of the present invention is to provide a method of determining soft or softer handoff on cell switching in a mobile communication system, which enables a mobile communication network or a terminal to efficiently determine soft or softer handoff on cell switching.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of cell switching in a mobile communication system comprises the steps of determining an active set comprising at least one sector being a serving sector; receiving from a network, preferably through a universal handoff direction message, a control parameter (PWR_COMB_IND or PDCH_GROUP_IND) for each sector in the active set, the control parameter being associated with using at least one of first-type (soft) and second-type (softer) handoff when transitioning from the serving sector to a target sector; determining in the mobile station identifier parameters (PDCH_GROUP_IDENTIFIER) corresponding to the sectors in the active set, each identifier parameter being determined by associating control parameters of at least two sectors in the active set (for example, PDCH_GROUP_IDENTIFIER is set to previous value if next PDCH_GROUP_IND is set to "1"); determining in the mobile station at least one of the first-type and the second-type handoff by comparing at least two identifier parameters corresponding to the sectors in the active set; and selecting cell switching parameters corresponding to at least one of the first-type and the second-type handoff.

According to one aspect of the present invention, the control parameters is determined by using one sector of the active set as a reference and comparing other sector in the active set to determine whether these neighboring sectors are with the same cell, wherein a cell comprises at least one sector. The control parameter preferably comprises a power combining indicator if a packet data channel group indicator is not received from the network.

According to another aspect of the present invention, the step of determining the identifier parameters further comprises: comparing the control parameter of one sector to next sector in the active set so that if the control parameter of the next sector is at a first logic level (if PDCH_GROUP_IND=1) then the corresponding identifier parameter is set to previous identifier parameter, and if the control parameter of the next sector is at a second logic level (if PDCH_GROUP_IND=0) then the corresponding identifier parameter is increase by a predetermined value (by one) from the previous identifier parameter. The identifier parameter corresponding to a first sector in the active set is set to a predetermined value (for example "000").

According to another aspect of the present invention, the step of determining the identifier parameters further comprises: setting a next identifier parameter to the identifier parameter of previous sector in the active set that supports the packet data communication, if corresponding control parameter is set to a first level and there are no other sectors between a present sector corresponding to the next identifier parameter and a previous sector that support the packet data communication; setting the identifier parameter to the identifier parameter of previous sector in the active set that supports the packet data communication, if corresponding control parameter is set to a first level and all sectors between the present sector corresponding to the next identifier parameter and a previous sector in the active set that support packet data communication have corresponding control parameter set to the first level; and otherwise set the identifier parameter to a value different (for example, one greater) than the identifier parameter corresponding to previous sector that supports the data packet communication in the active set.

According to still another aspect of the present invention, the step of determining the first-type and second-type handoff further comprises:comparing the identifier parameter of the serving sector to the target sector in the active set so that if both identifier parameters are different then the first-type handoff is recognized for the mobile terminal to transition from the serving sector to the target sector, and if both identifier parameters are the same, then the second-type handoff is recognized.

In another embodiment of the present invention, a mobile station for use in a mobile communication system comprises an antenna; a processor for controlling the mobile station; a display in communication with the processor to display user interface information; a keyboard in communication with the processor to input user controlled data. The processor comprises means for receiving a control parameter for each sector in the active set, the control parameter being associated with using at least one of first-type (soft) and second-type (softer) handoff when transitioning from the serving sector to a target sector; means for determining identifier parameters (PDCH_GROUP_IDENTIFIER) corresponding to the sectors in the active set, each identifier parameter being determined by associating control parameters of at least two sectors in the active set (for example, PDCH_GROUP_IDENTIFIER is set to previous value if next PDCH_GROUP_IND is set to "1"); means for determining at least one of the first-type and the second-type handoff by comparing at least two identifier parameters corresponding to the sectors in the active set; and means for selecting cell switching parameters corresponding to at least one of the first-type and the second-type handoff.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. To aid describing the present invention, certain parameter names are being used to describe the channels, messages and variables communicated between mobile and base stations. It should be noted that such parameter names are for illustration purposes only, and that other names may be used to describe the same or similar function.

Figure 1:
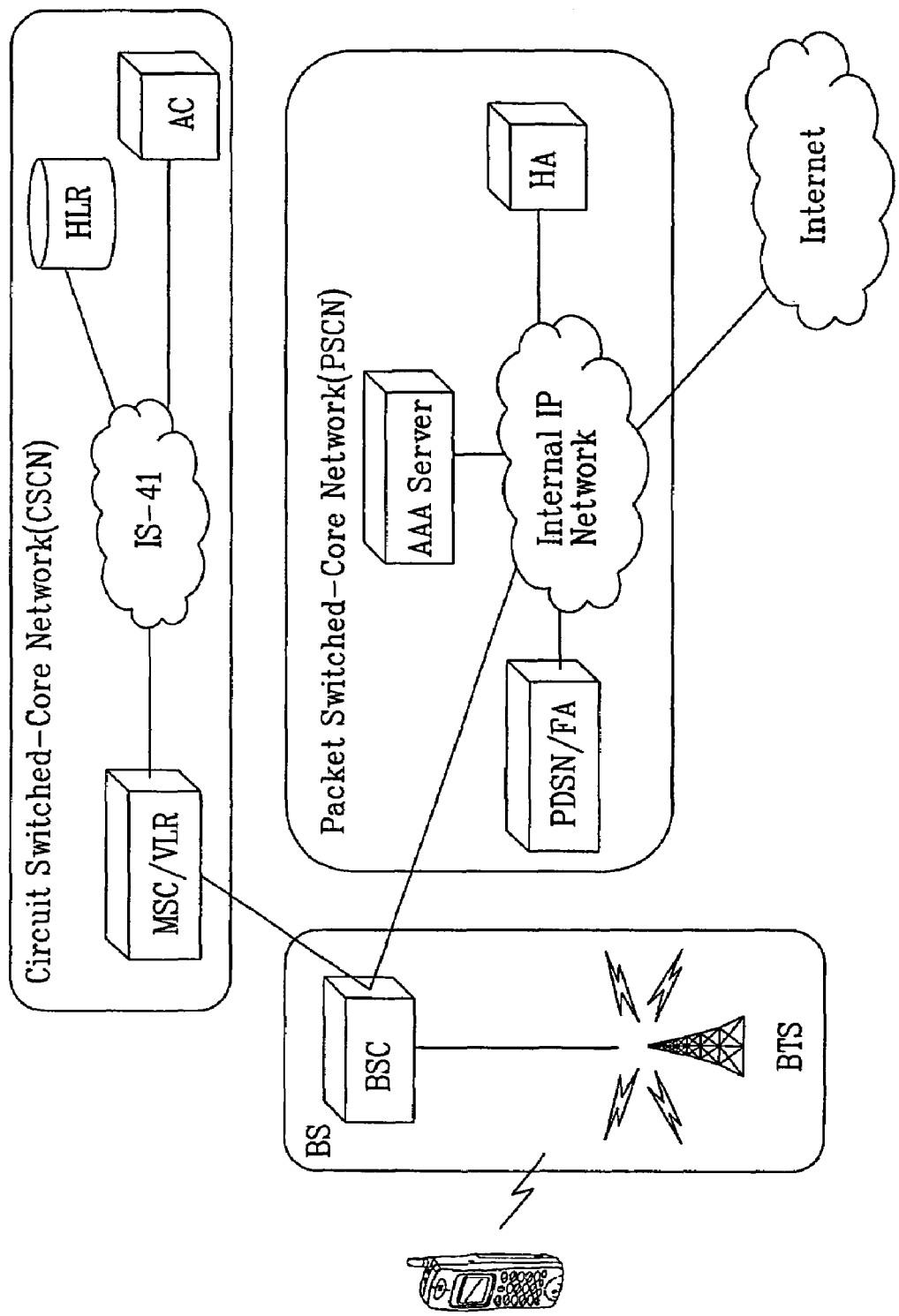
FIG. 1 illustrates a wireless communication network architecture.
Figure 2:
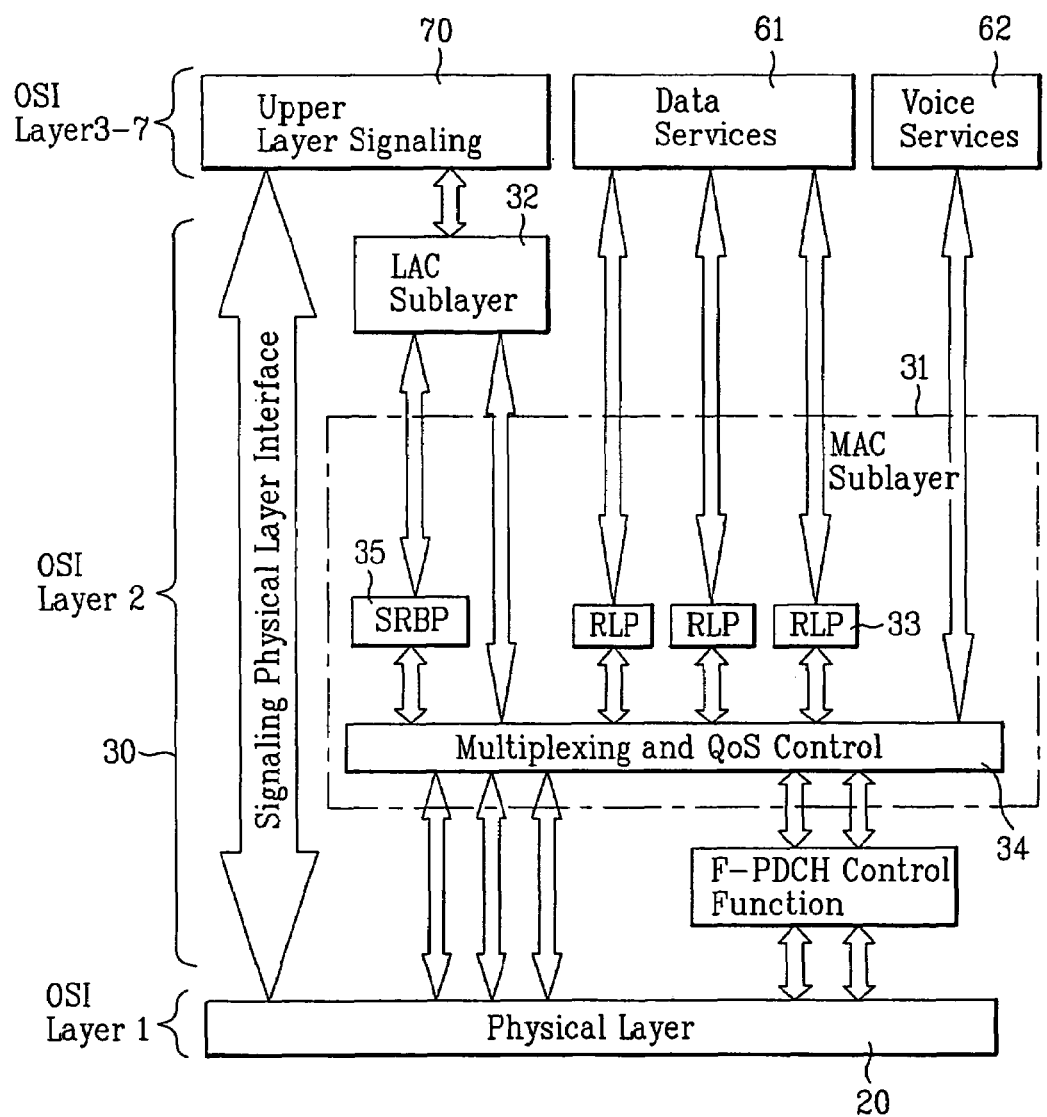
FIG. 2 illustrates the data link protocol architecture for a wireless network.
Figure 3:
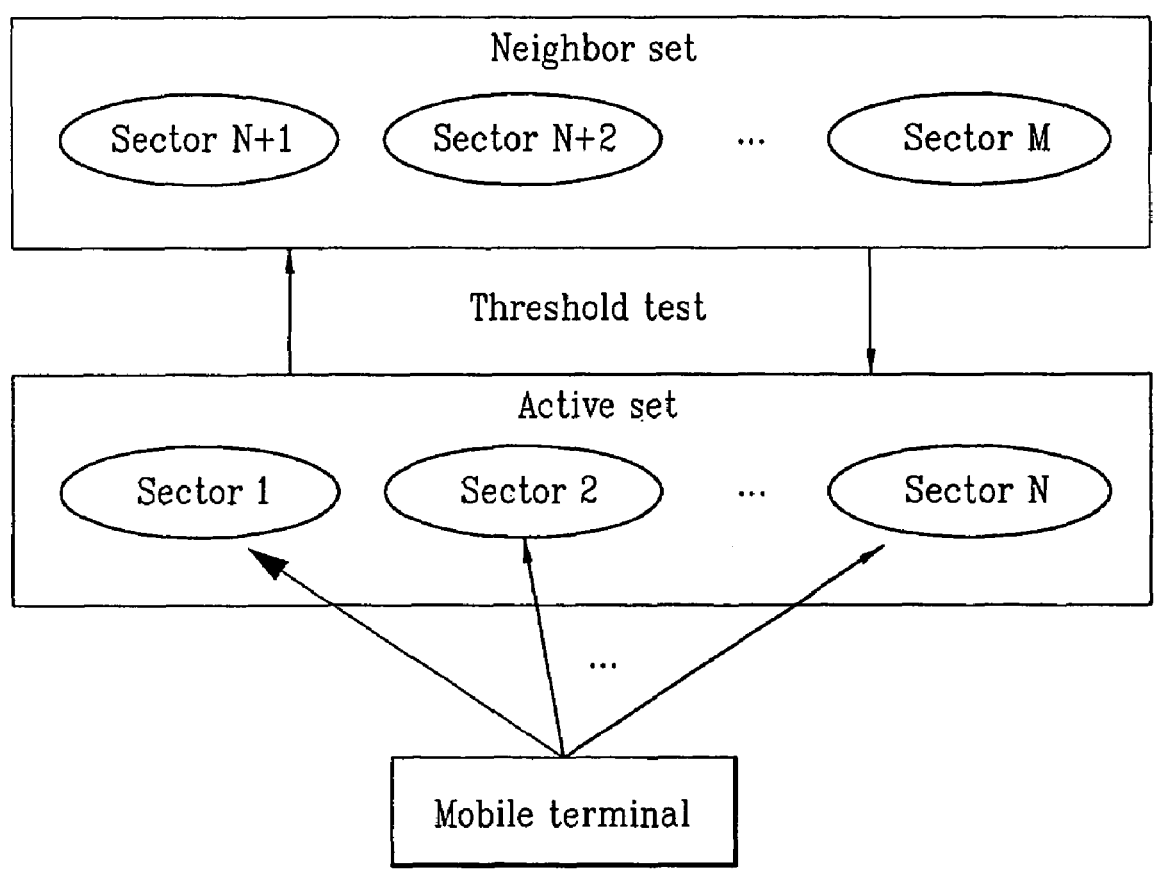
FIG. 3 illustrates an exemplary diagram of determining and managing one serving sector in an active set.
Figure 4:
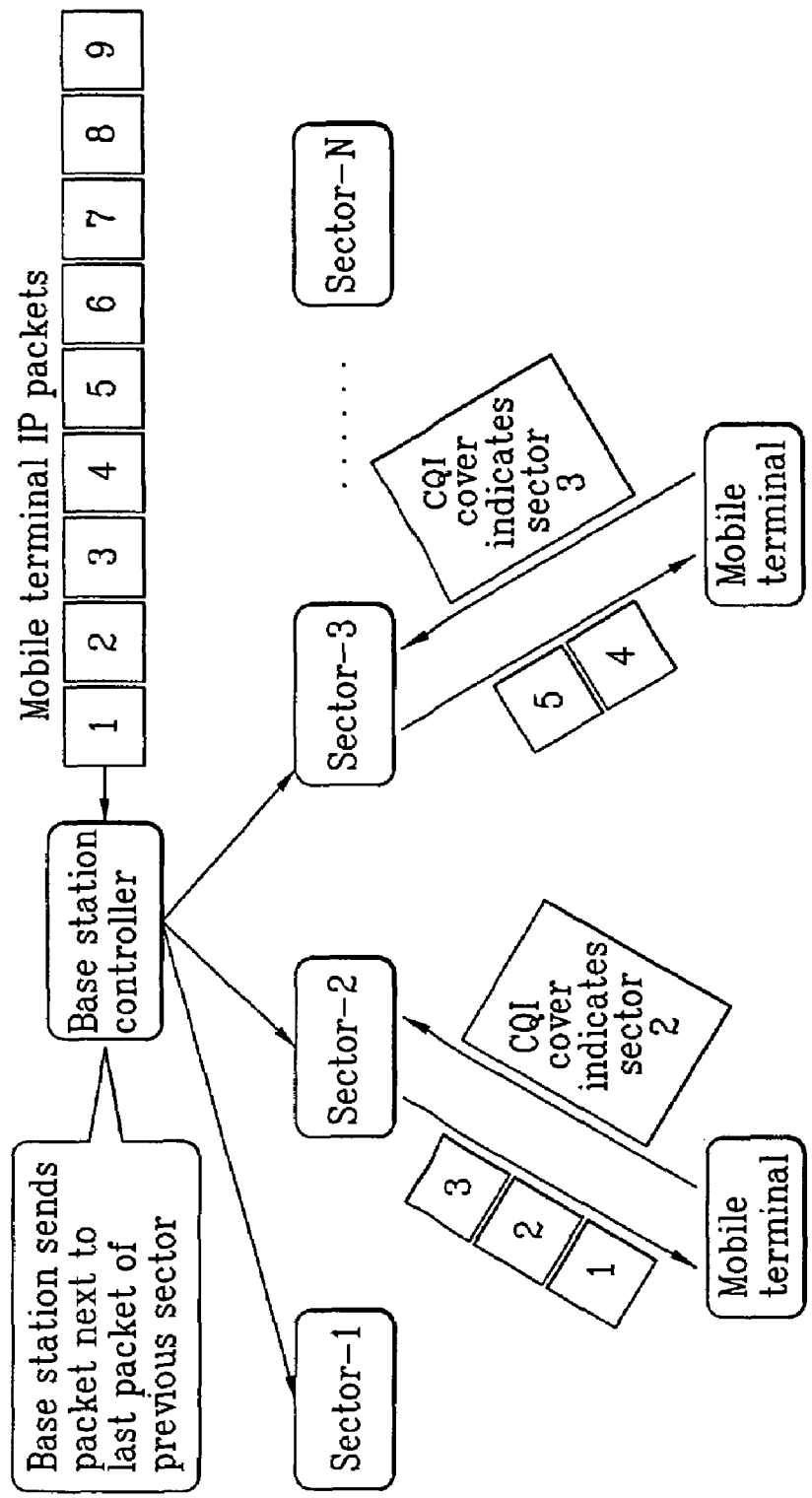
FIG. 4 illustrates an example of cell switching.
Figure 5:
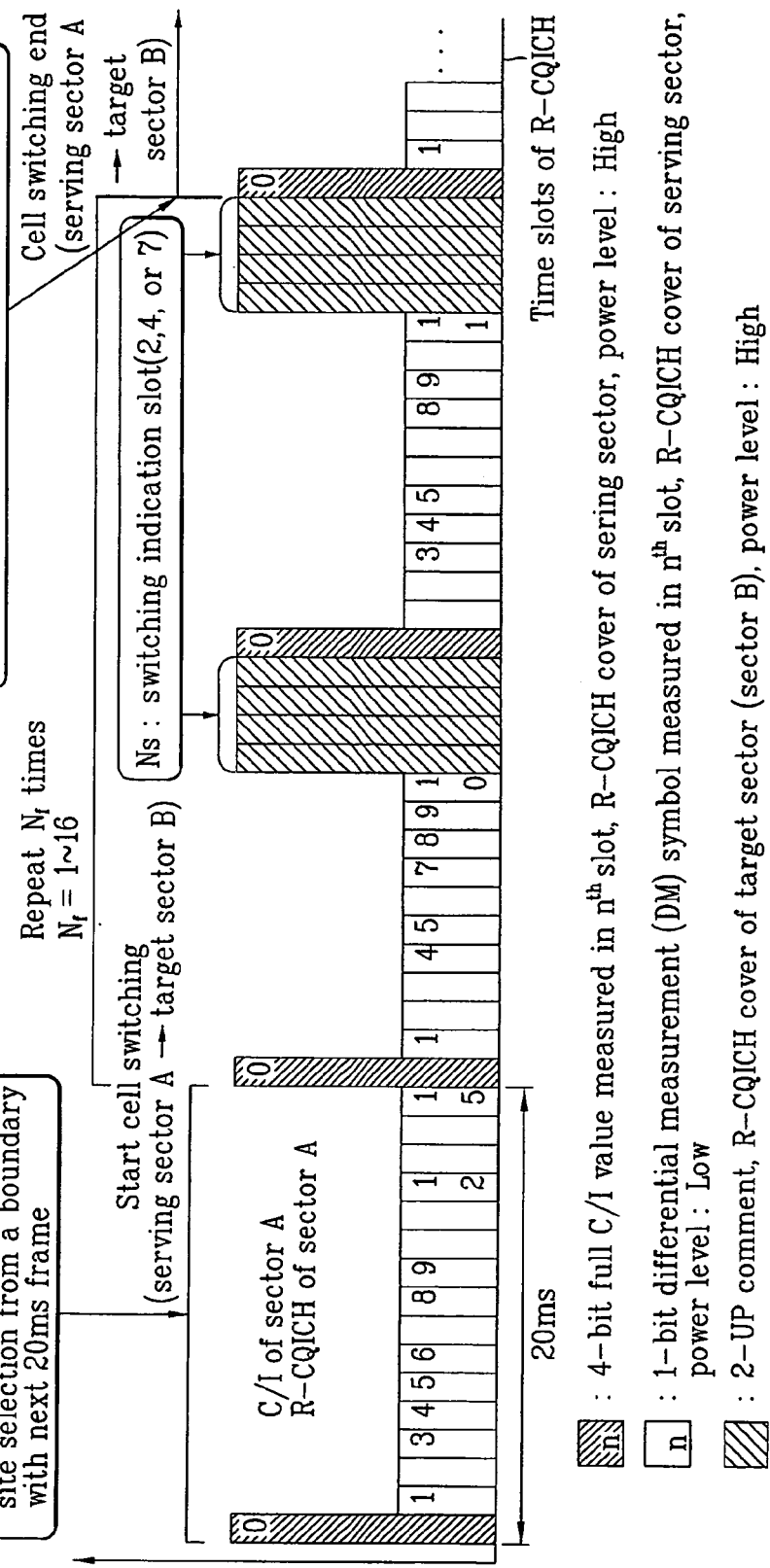
FIG. 5 illustrates a reverse channel quality indicator channel (R-CQICH) during cell switching from serving sector A to target sector B according to one embodiment of the present invention.

FIG. 5 illustrates a reverse channel quality indicator channel (R-CQICH) during cell switching from serving sector A to target sector B according to an embodiment of the present invention.

Referring to FIG. 5, a frame length of R-CQICH is preferably 20 ms and is constructed with 16 slots. In normal state instead of cell switching state, each of the slots of the frame transmits measured channel status information to a mobile station.

In the embodiment of the present invention, a first slot denoted by '0' expresses the measured channel status information by 4-bits to transmit to the mobile station, and each of the subsequent slots 1~15 expresses whether a channel status of the current slot is better (UP) or worse (DOWN) than that of the previous slot by 1-bit to transmit to the mobile station. Namely, a differential measurement (DM) is performed on each slot.

In this embodiment, all slots in the frame use the CQI cover as an identifier indicating a current serving sector. In the cell switching state, an UP command is always issued for last Ns (number of switching slots) slots of each channel frame regardless of the channel status and the corresponding slots use the CQI cover indicating the target sector (i.e. a sector to be a subsequent serving sector). Such a procedure is repeated for Nf (number of channel frames for cell switching) frames.

'Ns' and 'Nf' used for the cell switching procedure vary according to whether the corresponding sectors are related to the soft handoff or the softer handoff. In case of the soft handoff, parameter NUM_SOFT_SWITCHING_SLOTS corresponding to the number of soft switching slots is used as the Ns and parameter NUM_SOFT_SWITCHING_FRAMES corresponding to the number of soft switching frames is used as the Nf. In case of the softer handoff, parameter NUM_SOFTER_SWITCHING_SLOTS corresponding to the number of softer switching slots is used as the Ns and parameter NUM_SOFTER_SWITCHING_FRAMES corresponding to the number of softer switching frames is used as the Nf.

In determining the cell switching parameters; the mobile station needs another parameter of time required for the handoff. Such a time varies in accordance with the soft handoff or the softer handoff as well. In case of the soft handoff, a parameter corresponding to a soft switching delay number NUM_SOFT_SWITCHING_DELAY is used. Alternatively, during a softer handoff, a parameter corresponding to a softer switching delay number NUM_SOFTER_SWITCHING_DELAY is used.

For example, the parameters, such as NUM_SOFT_SWITCHING_SLOTS, NUM_SOFTER_SWITCHING_SLOTS, NUM_SOFT_SWITCHING_FRAMES, NUM_SOFTER_SWITCHING_FRAMES, NUM_SOFT_SWITCHING_SLOTS_CHM, NUM_SOFTER_SWITCHING_SLOTS_CHM, NUM_SOFT_SWITCHING_FRAMES_CHM, NUM_SOFTER_SWITCHING_FRAMES_CHM, NUM_SOFT_SWITCHING_DELAY, and NUM_SOFTER_SWITCHING_DELAY, depend on the handoff information which is transmitted to the mobile station through a channel assignment message, such as the ECAM (extended channel assignment message), and a handoff message, such as the UHDM (universal handoff direction message), and are selectively used for the cell switching in the mobile station.

The parameters NUM_SOFT_SWITCHING_SLOTS_CHM, NUM_SOFTER_SWITCHING_SLOTS_CHM, NUM_SOFT_SWITCHING_FRAMES_CHM, and NUM_SOFTER_SWITCHING_FRAMES_CHM are preferably used in case that the terminal is in control hold mode.

The use of soft or softer handoff related parameters are generally dictated upon determination by mobile station which type of handoff to use transitioning from a serving sector to a target sector. Therefore, the correct determination of soft or softer handoff according to a preferred embodiment of the present invention is explained in detail.

The base station, through a down link message, such as universal handoff direction message, provides the mobile station information pertaining to whether to use soft or softer handoff. Such handoff information may be based on a power combining indicator (PWR_COMB_IND), or alternatively, a packet data channel group indicator (PDCH_GROUP_IND), if packet data is supported in the communication network. In the network, the actual parameter may be used for more than one purpose. For example, the PWR_COMB_IND also indicates whether or not to combine power control bits for one or more sectors.

Figure 6:
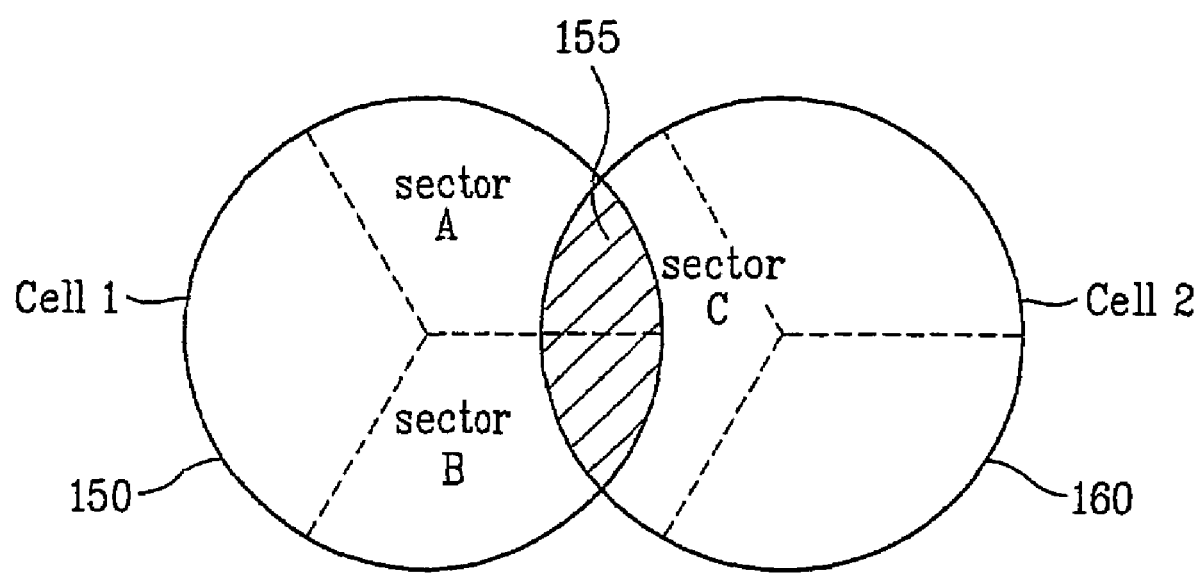
FIG. 6 illustrates cell switching diagram, more particularly, with respect to the soft and softer handoffs.

However, using such handoff information some times provides incorrect handoff instruction. FIG. 6 illustrates cell switching diagram, more particularly, with respect to the soft and softer handoffs. For example, referring to FIG. 6, the mobile station is located in the shaded area 155. Hence, the active set comprises sectors A, B and C. Let's assume that sector A is a serving sector and is the first one in the active set list. The base station compares sectors (also referred to as pilots) in the active set to each other to set a value corresponding to soft handoff or softer handoff for each sector.

When determining soft or softer handoff, there may exist inconsistency between MAC and Signaling layers in the operation of PDCH_GROUP_IND.

In the MAC layer, if a target sector (for example, Sector B in FIG. 6) is not in the active set but a current sector (for example, Sector A in FIG. 6) is in the active set, the mobile (or base) station performs the following: If the PDCH_

GROUP_IND field corresponding to the target sector is equal to the PDCH_GROUP_IND field corresponding to the current sector, the mobile (or base) station sets NUM_SWITCHING_FRAMES to NUM_SOFTER_SWITCHING_FRAMES and sets NUM_SWITCHING_SLOTS to NUM_SOFTER_SWITCHING_SLOTS. Otherwise, the mobile (or base) station sets NUM_SWITCHING_FRAMES to NUM_SOFT_SWITCHING_FRAMES and sets NUM_SWITCHING_SLOTS to NUM_SOFT_SWITCHING_SLOTS.

In the Signaling layer, if PDCH_GROUP_IND_INCL is set to '0', the base station omits this field; otherwise, the base station includes this field and sets it as follows.

If the mobile station is to use the softer reselection parameters when re-pointing between this pilot and the previous pilot in this message, the base station sets this field to '1'. If the mobile station is to use the soft reselection parameters when re-pointing between this pilot and the previous pilot in this message, the base station sets this field to '0'. The base station sets this field to '0' in the first record in the pilot list.

The respective set values for the sectors, which are included in a first parameter (or field) PDCH_GROUP_IND corresponding to a packet data channel group indication for determining cell switching parameters between neighbor sectors in the active set and a second parameter (or field) PWR_COMB_IND corresponding to a power combination indication for indicating whether power control bits between the neighbor sectors in the active set are combined or not, are transmitted to the mobile station. Receiving the first parameter PDCH_GROUP_IND from the base station, the mobile station generates values of a parameter PDCH_GROUP_IDENTIFIER corresponding to a packet data channel group identifier using each of the values which are set by the base station to be included in the fields, respectively.

If the first parameter PDCH_GROUP_IND is not supported by the base station, the mobile station generates values of the parameter PDCH_GROUP_IDENTIFIER corresponding to the packet data channel group identifier using the values included in the second parameter PWR_COMB_IND.

Subsequently, the mobile station determines whether the serving and target sectors are in soft or softer handoff using the generated values of the parameter PDCH_GROUP_IDENTIFIER, and then selects the parameters for the cell switching according to a result of the determination.

Preferably, relating to distinction between the soft handoff and the softer handoff, the base station may transmit both the parameters PDCH_GROUP_IND and PWR_COMB_IND to the mobile station through the ECAM (extended channel assignment message) and the UHDM (universal handoff direction message). Alternatively, the base station may only support the parameter PWR_COMB_IND.

The first parameter PDCH_GROUP_IND is preferably a 1-bit parameter used for determining the parameters for the cell switching between the neighboring sectors in the active set. A value of the 1-bit for the first sector of the list in the active set is '0'. After the first sector, if a subsequent sector compared to a previous sector is in the soft handoff relation, the 1-bit is set to '0'. If the subsequent sector is in the softer handoff relation, the 1-bit is set to '1'.

The second parameter PWR_COMB_IND is preferably a 1-bit parameter used for indicating whether power control bits between the neighboring sectors in the active set are combined or not. A value of the 1-bit for the first sector of the list in the active set is '0'. After the first sector, if a subsequent sector compared to a previous sector is in the soft handoff relation, the 1-bit is set to '0'. If the subsequent sector is in the softer handoff relation, the 1-bit is set to '1'. In case that the first parameter PDCH_GROUP_IND is not received from the base station, the second parameter PWR_COMB_IND can be used in determining the cell switching parameters.

According to the preferred embodiment of the present invention, a third parameter PDCH_GROUP_IDENTIFIER is newly defined and used in the mobile station to further carry out the determination of the soft or softer handoff between two sectors of one or more cells. The parameter PDCH_GROUP_IDENTIFIER represents packet data group identifier information, and is preferably 3 bits long.

The mobile station uses the values of the received first or second parameter PDCH_GROUP_IND or PWR_COMB_IND to determine whether the corresponding sectors are in the soft or softer handoff relation and then determines the cell switching parameters.

Figure 7:
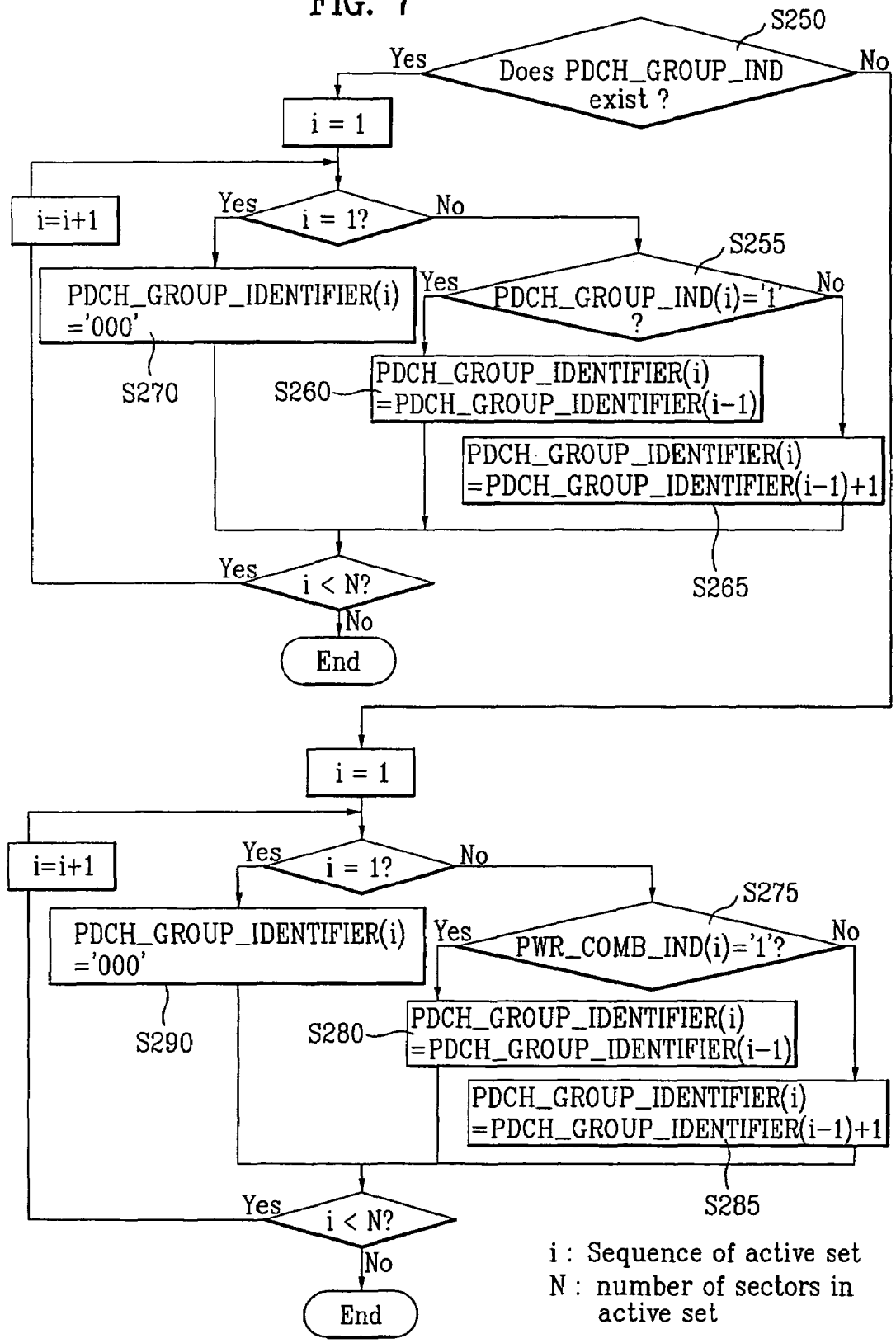
FIG. 7 is a flowchart for determining parameter PDCH_GROUP_IDENTIFIER corresponding to a packet data channel group identifier when the number of active sets is 'N'.

FIG. 7 is a flowchart for determining parameter PDCH_GROUP_IDENTIFIER when all sectors in the active set supports, for example, packet data channel (PDCH). The determination of the parameter PDCH_GROUP_IDENTIFIER is preferably performed in the signaling layer of the mobile station.

Referring to FIG. 7, the mobile station first determines whether the first parameter PDCH_GROUP_IND is received from the base station (S250). If the first parameter PDCH_GROUP_IND is received, the mobile station then determines whether the sector being examined is the first sector in the active set. If the corresponding sector is the first sector in the active set, the value of the parameter PDCH_GROUP_IDENTIFIER(1) is set to a predetermined value, preferably '000' (S270). If the corresponding sector is not the first sector in the active set, the value of the first parameter PDCH_GROUP_IND(i) of the corresponding sector (assuming that it is an $i^{th}$ sector in the active set) is examined. If the value of PDCH_GROUP_IND(i) is, for example, '1', then the value of the parameter PDCH_GROUP_IDENTIFIER(i) is determined to be equal to that of $(i-1)^{th}$ parameter PDCH_GROUP_IDENTIFIER(i-1) (S260). If the value of PDCH_GROUP_IND(i) is, for example, '0', then the value of the parameter PDCH_GROUP_IDENTIFIER(i) is '1' greater than that of parameter PDCH_GROUP_IDENTIFIER(i-1) (S265). In other words, PDCH_GROUP_IDENTIFIER (i) is set to PDCH_GROUP_IDENTIFIER (i-1)+1.

If the first parameter PDCH_GROUP_IND is not received from the base station, the mobile station determines whether the corresponding sector is the first sector or not. If the corresponding sector is the first sector, the value of the parameter PDCH_GROUP_IDENTIFIER(1) is set to '000' (S290). If the corresponding sector is not the first sector, the value of the second parameter PWR_COMB_IND(i) of the corresponding sector is examined (S275). If the value of PWR_COMB_IND(i) is, for example, '1', the value of the parameter PDCH_GROUP_IDENTIFIER(i) is determined to be equal to that of $(i-1)^{th}$ parameter PDCH_GROUP_IDENTIFIER(i-1) (S280). If the value of PWR_COMB_IND(i) is, for example, '0', the value of the parameter PDCH_GROUP_IDENTIFIER(i) is 1 greater than that of parameter PDCH_GROUP_IDENTIFIER(i-1) (S285). In other words, PDCH_GROUP_IDENTIFIER (i) is set to PDCH_GROUP_IDENTIFIER (i-1)+1.

The above process is best explained by an example. It is assumed that the sectors in the active set are A1, A2, B2, and C3, that the sectors A1 and A2 are in the softer handoff relation, and that the rest of the sectors are in the soft handoff relation. In this case, values of the first or second parameters PDCH_GROUP_IND or PWR_COMB_IND can be determined using Expression 1.

Expression 1

PDCH_GROUP_IND(A1)=0,
PDCH_GROUP_IND(A2)=1,
PDCH_GROUP_IND(B2)=0,
PDCH_GROUP_IND(C3)=0 or
PWR_COMB_IND(A1)=0,
PWR_COMB_IND (A2)=1,
PWR_COMB_IND (B2)=0,
PWR_COMB_IND (C3)=0

If the parameter PDCH_GROUP_IDENTIFIER comprises with three bits, values of the parameter PDCH_GROUP_IDENTIFIER can be represented by Expression 2.

Expression 2

PDCH_GROUP_IDENTIFIER(A1)='000'
PDCH_GROUP_IDENTIFIER(A2)='000'
PDCH_GROUP_IDENTIFIER(B1)='001'
PDCH_GROUP_IDENTIFIER(C3)='010'

Once the values of the parameter PDCH_GROUP_IDENTIFIER for the sectors of the active set are determined, the mobile station may determine whether the serving and target sectors related to the cell switching are in the soft or softer handoff relation according to the determined values of the parameter PDCH_GROUP_IDENTIFIER.

Figure 8:
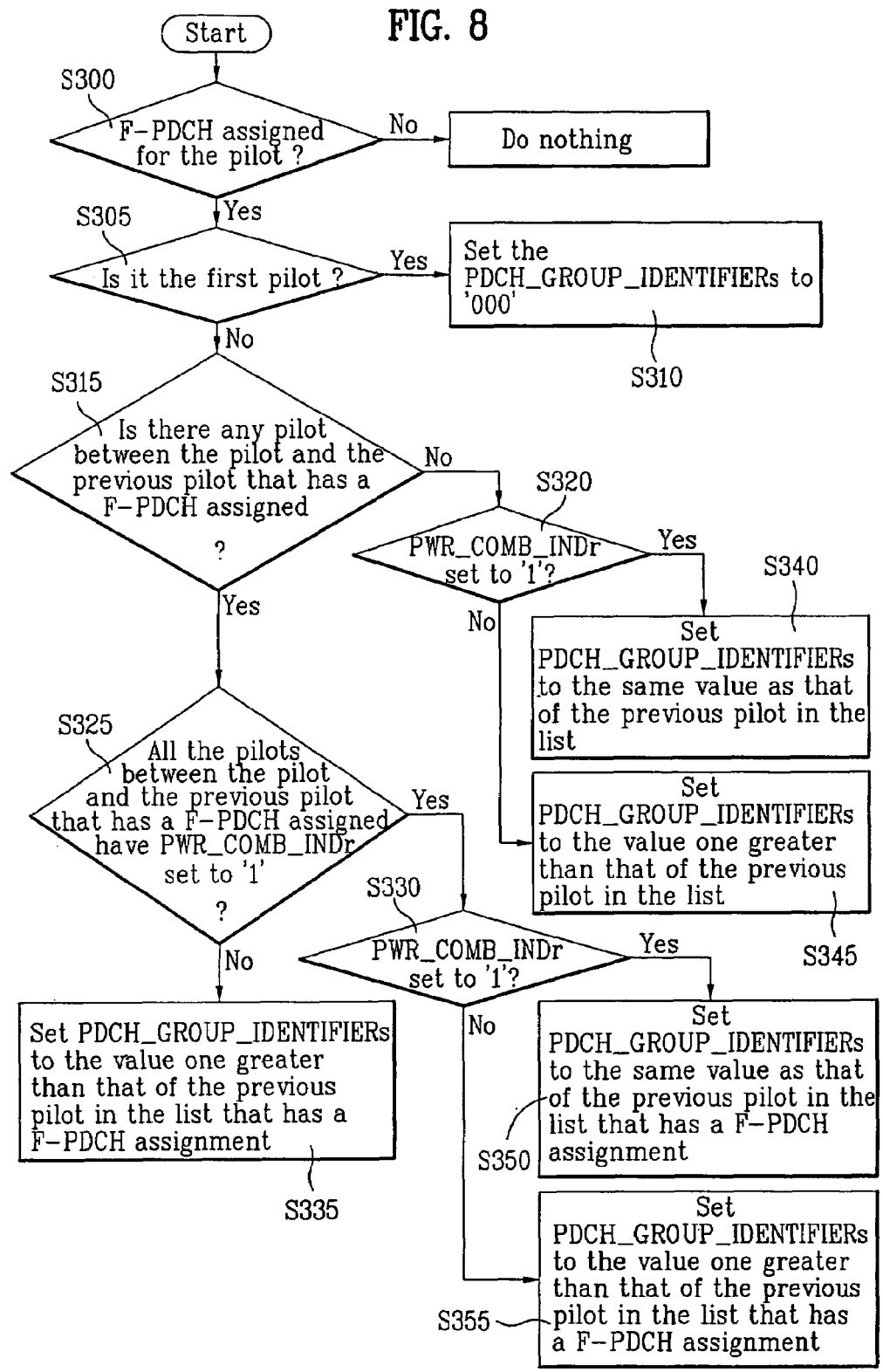
FIG. 8 illustrates a flow chart for determining the parameter PDCH_GROUP_IDENTIFIER when not all sectors in the active set support packet data channel (PDCH).

FIG. 8 illustrates a flow chart for determining the parameter PDCH_GROUP_IDENTIFIER when not all sectors in the active set support packet data channel (PDCH).

Referring to FIG. 8, in the event that not all sectors (also referred to as "pilots" since the active set is a list of pilots) in the active set support the packet data, the first sector in the list that has a PDCH assignment, the mobile station sets PDCH_GROUP_IDENTIFIER to '000' as shown in S310 of FIG. 8. Otherwise, the mobile station performs the following: If PDCH is assigned for this pilot (sector) and if PWR_COMB_IND is set to '1' (S320), and there are no pilots between this pilot and the previous pilot in the list that has a PDCH assigned (S315), the mobile station sets PDCH_GROUP_IDENTIFIER to the same value as that of the previous pilot in the list that has a F-PDCH assigned (S340). Otherwise, the mobile station sets PDCH_GROUP_IDENTIFIER to the value one greater than that of the previous pilot in the list (S345).

If PWR_COMB_IND is set to '1' (S330), and all pilots between this pilot and the previous pilot in the list that has a F-PDCH assigned have PWR_COMB_IND set to '1' (S325), the mobile station sets PDCH_GROUP_IDENTIFIER to the same value as that of the previous pilot in the list that has a F-PDCH assigned (S350). Otherwise, the mobile station sets PDCH_GROUP_IDENTIFIER to the value one greater than that of the previous pilot in the list that has a F-PDCH assigned (S355).

Figure 9:
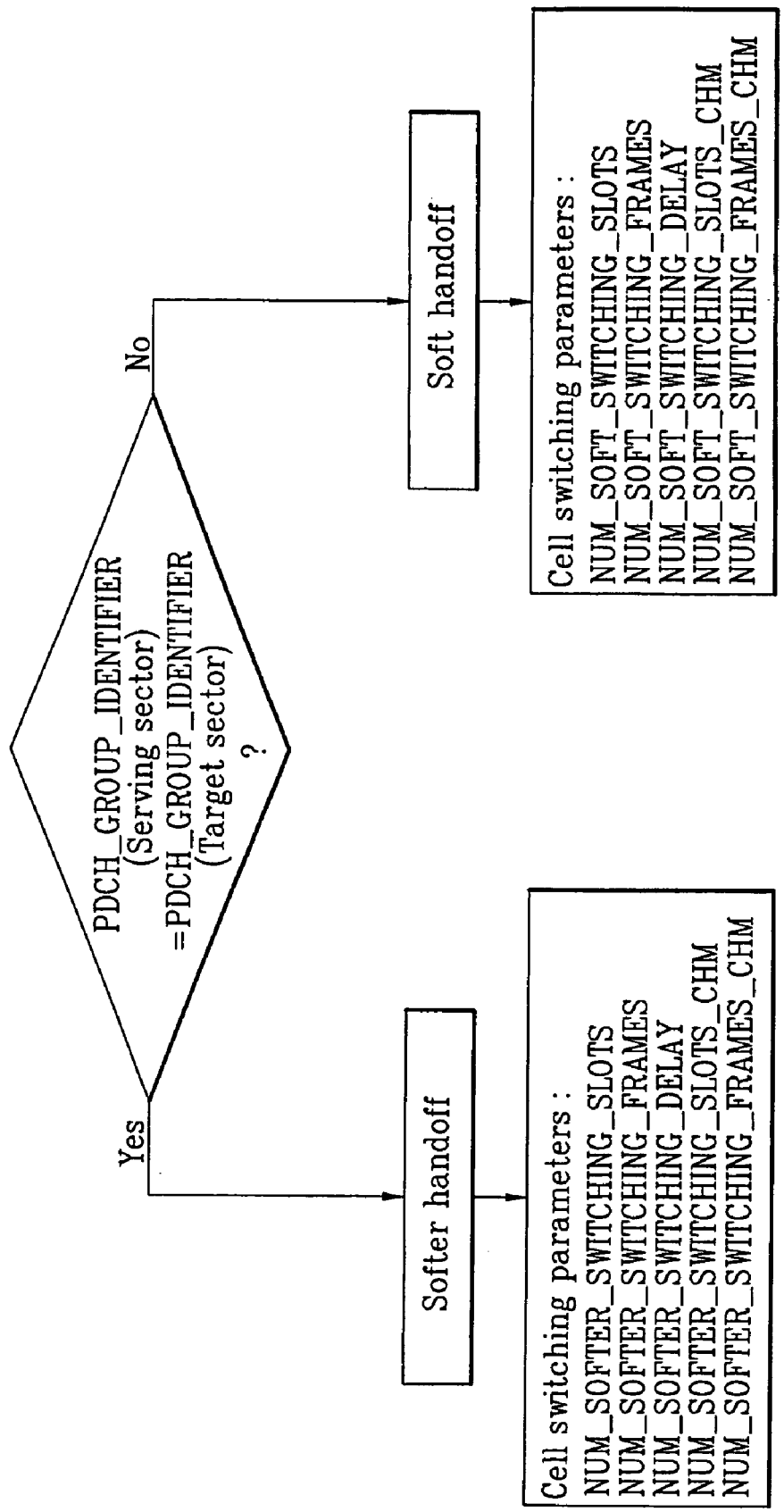
FIG. 9 is a flowchart for determining whether serving and target sectors are in soft or softer handoff relationship according to the preferred embodiment of the present invention.

FIG. 9 is a flowchart for determining whether serving and target sectors are in soft or softer handoff relation using values of a packet data channel group identifier parameter PDCH_GROUP_IDENTIFIER in the mobile station. The determination of the whether the soft or softer handoff should be used based on the value of the parameter PDCH_GROUP_IDENTIFIER(i) is preferably made in the MAC layer of the mobile station.

Referring to FIG. 9, the mobile station compares a value of the parameter PDCH_GROUP_IDENTIFIER(serving sector) to that of the parameter PDCH_GROUP_IDENTIFIER(target sector). If they are equal, it is determined that the serving and target sectors are in the softer handoff relation. If they fail to be equal, it is determined that the serving and target sectors are in the soft handoff relation.

As mentioned in the foregoing description, if it is determined that the serving and target sectors are in the soft handoff relation, the mobile station uses a parameter NUM_SOFT_SWITCHING_SLOTS corresponding to the soft switching slot number, a parameter NUM_SOFT_SWITCHING_FRAMES corresponding to the soft switching frame number, a parameter NUM_SOFT_SWITCHING_SLOTS_CHM corresponding to the soft switching slot number in a control hold mode, a parameter NUM_SOFT_SWITCHING_FRAMES_CHM corresponding to the soft switching frame number in the control hold mode, and a parameter NUM_SOFT_SWITCHING_DELAY corresponding to the soft switching delay number as the cell switching parameters.

If it is determined that the serving and target sectors are in the softer handoff relation, the mobile station uses a parameter NUM_SOFTER_SWITCHING_SLOTS corresponding to the softer switching slot number, a parameter NUM_SOFTER_SWITCHING_FRAMES corresponding to the softer switching frame number, a parameter NUM_SOFTER_SWITCHING_SLOTS_CHM corresponding to the softer switching slot number in a control hold mode, a parameter NUM_SOFTER_SWITCHING_FRAMES_CHM corresponding to the softer switching frame number in the control hold mode, and a parameter NUM_SOFTER_SWITCHING_DELAY corresponding to the softer switching delay number as the cell switching parameters.

Accordingly, in the present invention, the new parameter named identifier PDCH_GROUP_IDENTIFIER is defined, which facilitates to determine whether the related sectors are in the soft or softer handoff relation using the parameter values. Therefore, the present invention enables to efficiently select the cell switching parameters.

Figure 10:
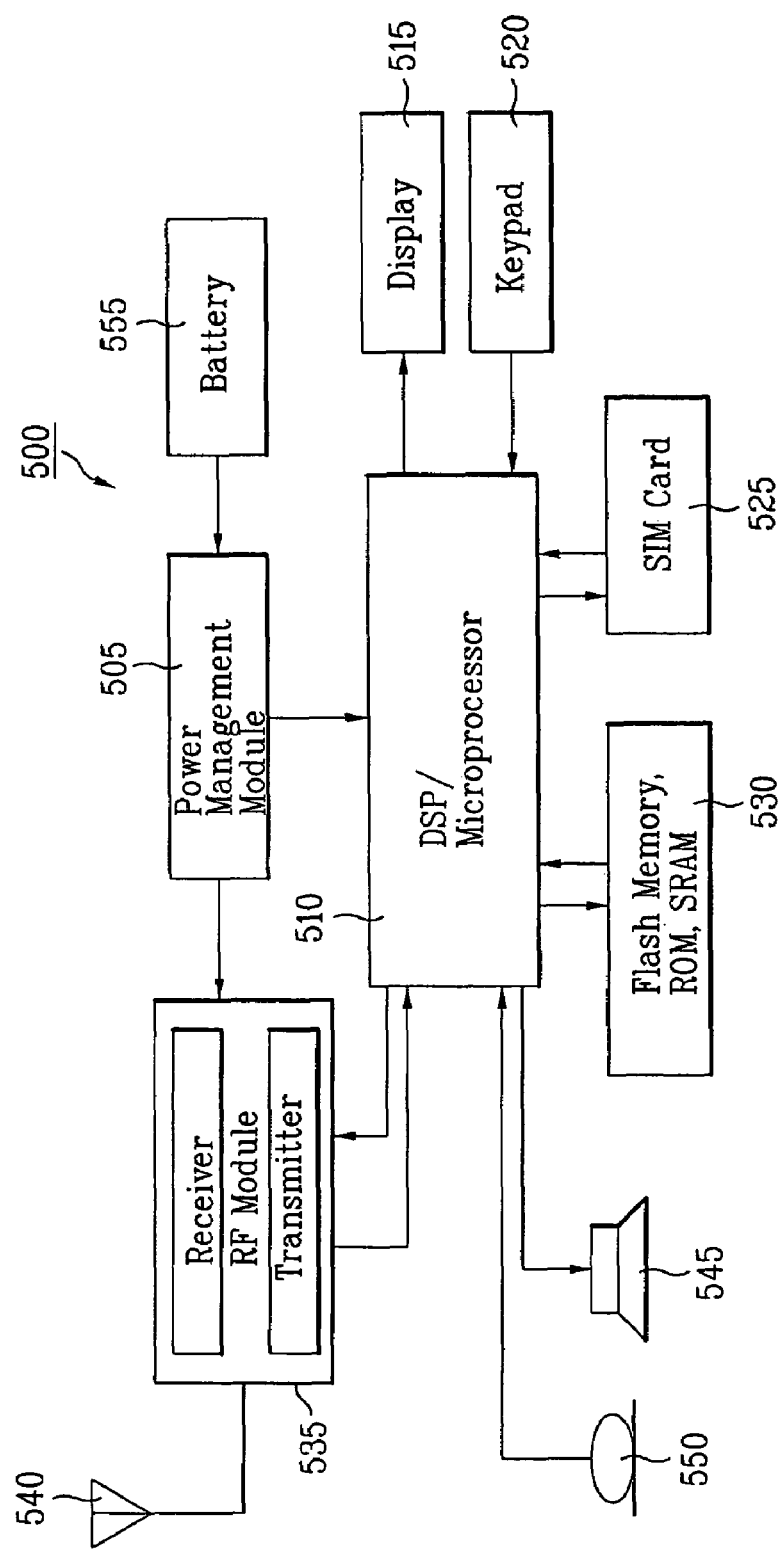
FIG. 10 illustrates a block diagram of mobile station according to the preferred embodiment of the present invention.

FIG. 10 illustrates a block diagram of mobile station according to the preferred embodiment of the present invention.

Referring to FIG. 10, the mobile station 500 comprises a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF section 535, to initiate communication, for example, transmit radio signals comprising voice communication data. The RF section 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example.

It will be apparent to one skilled in the art that the preferred embodiments of the present invention can be readily implemented using, for example, the processor 510 or other data or digital processing device, either alone or in combination with external support logic.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of cell switching in a mobile communication system comprising at least one base station, each base station corresponding to one-or-more sectors, comprising the steps of:

determining an active set comprising at least one sector being a serving sector;

receiving a control parameter for each sector in the active set, the control parameter being associated with using at least one of first-type and second-type handoff when transitioning from the serving sector to a target sector;

determining identifier parameters corresponding to the sectors in the active set, each identifier parameter being determined by associating control parameters of at least two sectors in the active set, wherein the identifier parameters are determined by comparing the control parameter of one sector to next sector in the active set so that if the control parameter of the next sector is at a first logic level, then the corresponding identifier parameter is set to previous identifier parameter, and if the control parameter of the next sector is at a second logic level, then the corresponding identifier parameter is increased by a predetermined value from the previous identifier parameter;

determining at least one of the first-type and the second-type handoff by comparing at least two identifier parameters corresponding to the sectors in the active set; and selecting cell switching parameters corresponding to at least one of the first-type and the second-type handoff.

2. The method of claim 1, wherein the control parameters is determined by using one sector of the active set as a reference and comparing other sector in the active set to determine whether neighboring sectors are with the same cell, wherein a cell comprises at least one sector.

3. The method of claim 1, wherein if a packet data channel group indicator is received from the network, the control parameter comprises the packet data channel group indicator, otherwise, the control parameter comprises a power combining indicator.

4. The method of claim 1, wherein the identifier parameter corresponding to a first sector in the active set is set to a predetermined value.

5. The method of claim 1, wherein the step of determining the identifier parameters further comprises:

setting a next identifier parameter to the identifier parameter of previous sector in the active set that supports the packet data communication, if corresponding control parameter is set to a first level and there are no other sectors between a present sector corresponding to the next identifier parameter and a previous sector that support the packet data communication;

setting the identifier parameter to the identifier parameter of previous sector in the active set that supports the packet data communication, if corresponding control parameter is set to a first level and all sectors between the present sector corresponding to the next identifier parameter and a previous sector in the active set that support packet data communication have corresponding control parameter set to the first level; and otherwise set the identifier parameter to a value different than the identifier parameter corresponding to previous sector that supports the data packet communication in the active set.

6. The method of claim 5, further comprising: setting the identifier parameter corresponding to a first sector in the active set to a predetermined value.

7. The method of claim 1, wherein the step of determining the first-type and second-type handoff further comprises:

comparing the identifier parameter of the serving sector to the target sector in the active set so that if both identifier parameters are different then the first-type handoff is recognized for the mobile terminal to transition from the serving sector to the target sector, and if both identifier parameters are the same, then the second-type handoff is recognized.

8. The method of claim 5, wherein the step of determining the first-type and second-type handoff further comprises:

comparing the identifier parameter of the serving sector to the target sector in the active set so that if both identifier parameters are different then the first-type handoff is recognized for the mobile terminal to transition from the serving sector to the target sector, and if both identifier parameters are the same, then the second-type handoff is recognized.

9. A mobile station for use in a mobile communication system comprising at least one base station, each base station corresponding to one-or-more sectors, the mobile station comprising:
an antenna;
a processor for controlling the mobile station;
a display in communication with the processor to display user interface information;
a keyboard in communication with the processor to input user controlled data;
the processor comprising
means for receiving a control parameter for each sector in the active set, the control parameter being associated with using at least one of first-type and second-type handoff when transitioning from the serving sector to a target sector;
means for determining identifier parameters corresponding to the sectors in the active set, each identifier parameter being determined by associating control parameters of at least two sectors in the active set, wherein the identifier parameters are determined by comparing the control parameter of one sector to next sector in the active set so that if the control parameter of the next sector is at a first logic level, then the corresponding identifier parameter is set to previous identifier parameter, and if the control parameter of the next sector is at a second logic level, then the corresponding identifier parameter is increased by a predetermined value from the previous identifier parameter;
means for determining at least one of the first-type and the second-type handoff by comparing at least two identifier parameters corresponding to the sectors in the active set; and
means for selecting cell switching parameters corresponding to at least one of the first-type and the second-type handoff.

10. The mobile station of claim 9, wherein the control parameters is determined by using one sector of the active set as a reference and comparing other sector in the active set to determine whether neighboring sectors are with the same cell, wherein a cell comprises at least one sector.

11. The mobile station of claim 9, wherein if a packet data channel group indicator is received from the network, the control parameter comprises the packet data channel group indicator, otherwise, the control parameter comprises a power combining indicator.

12. The mobile station of claim 9, wherein the identifier parameter corresponding to a first sector in the active set is set to a predetermined value.

13. The mobile station of claim 9, wherein the processor determines the identifier parameters by:
setting a next identifier parameter to the identifier parameter of previous sector in the active set that supports the packet data communication, if corresponding control parameter is set to a first level and there are no other sectors between a present sector corresponding to the next identifier parameter and a previous sector that support the packet data communication;
setting the identifier parameter to the identifier parameter of previous sector in the active set that supports the packet data communication, if corresponding control parameter is set to a first level and all sectors between the present sector corresponding to the next identifier parameter and a previous sector in the active set that support packet data communication have corresponding control parameter set to the first level; and
otherwise set the identifier parameter to a value different than the identifier parameter corresponding to previous sector that supports the data packet communication in the active set.

14. The mobile station of claim 13, further comprising: setting an identifier parameter corresponding to a first sector in the active set to a predetermined value.

15. The mobile station of claim 9, wherein the step of determining the first-type and second-type handoff further comprises:
comparing the identifier parameter of the serving sector to the target sector in the active set so that if both identifier parameters are different then the first-type handoff is recognized for the mobile terminal to transition from the serving sector to the target sector, and
if both identifier parameters are the same, then the second-type handoff is recognized.

16. A method of cell switching using an active set of sectors in a mobile communication system comprising at least one fixed station, each fixed station corresponding to one-or-more sectors, comprising the steps of:
receiving a control parameter for each sector in the active set, the control parameter being associated with using at least one of first-type and second-type handoff when transitioning from a serving sector to a target sector;
determining identifier parameters corresponding to the sectors in the active set, each identifier parameter being determined by associating control parameters of at least two sectors in the active set, wherein the identifier parameters are determined by comparing the control parameter of one sector to next sector in the active set so that if the control parameter of the next sector is at a first logic level, then the corresponding identifier parameter is set to previous identifier parameter;
determining at least one of the first and the second handoff by comparing at least two identifier parameters corresponding to the sectors in the active set; and
selecting cell switching parameters corresponding to at least one of the first and the second handoff.

17. The method of claim 16, wherein the control parameters is determined by using one sector of the active set as a reference and comparing other sector in the active set to determine whether neighboring sectors are with the same cell, wherein a cell comprises at least one sector.

18. The method of claim 16, wherein if a packet data channel group indicator is received from the network, the control parameter comprises the packet data channel group indicator, otherwise, the control parameter comprises a power combining indicator.

19. The method of claim 16, wherein the step of determining the identifier parameters further comprises:
comparing the control parameter of one sector to next sector in the active set so that if the control parameter of the next sector is at a second logic level then the corresponding identifier parameter is increase by a predetermined value from the previous identifier parameter.

20. The method of claim 16, wherein the step of determining the identifier parameters further comprises:
setting a next identifier parameter to the identifier parameter of previous sector in the active set that supports the packet data communication, if corresponding control parameter is set to a first level and there are no other sectors between a present sector corresponding to the next identifier parameter and a previous sector that support the packet data communication;

setting the identifier parameter to the identifier parameter of previous sector in the active set that supports the packet data communication, if corresponding control parameter is set to a first level and all sectors between the present sector corresponding to the next identifier parameter and a previous sector in the active set that support packet data communication have corresponding control parameter set to the first level; and otherwise set the identifier parameter to a value different than the identifier parameter corresponding to previous sector that supports the data packet communication in the active set.

21. The method of claim 20, further comprising: setting the identifier parameter corresponding to a first sector in the active set to a predetermined value.

22. The method of claim 16, wherein the step of determining the first-type and second-type handoff further comprises:

comparing the identifier parameter of the serving sector to the target sector in the active set and based on the comparison determining whether the first-type or second-type handoff is recognized.

* * * * *